US008427500B1

(12) United States Patent
 Alakuijala

(10) Patent No.: US 8,427,500 B1
(45) Date of Patent: Apr. 23, 2013

(54) SPATIALLY AWARE SUB-PIXEL RENDERING

(75) Inventor: Jyrki Alakuijala, Zurich (CH)

(73) Assignee: Google Inc., Mountain View, CA (US)

( * ) Notice: Subject to any disclaimer, the term of this patent is extended or adjusted under 35 U.S.C. 154(b) by 712 days.

(21) Appl. No.: 12/591,352

(22) Filed: Nov. 17, 2009

(51) Int. Cl.
 *G09G 5/00* (2006.01)
 *G09G 5/02* (2006.01)
 *G09G 5/36* (2006.01)
 *G06F 15/16* (2006.01)
 *G06K 9/40* (2006.01)
 *G06K 9/54* (2006.01)

(52) U.S. Cl.
 USPC ........... 345/613; 345/589; 345/606; 345/611; 345/545; 382/264; 382/269; 382/274; 382/305

(58) Field of Classification Search .................. 345/418, 345/428, 589, 606, 611–613, 501–502, 506, 345/530, 545, 548–549; 382/254, 260, 263–264, 382/266–269, 274, 276, 300, 303–305
 See application file for complete search history.

(56) References Cited

U.S. PATENT DOCUMENTS

| 4,951,232 | A * | 8/1990 | Hannah | 345/422 |
| 6,072,500 | A * | 6/2000 | Foran et al. | 345/611 |
| 6,317,525 | B1 * | 11/2001 | Aleksic et al. | 382/299 |
| 6,683,996 | B1 * | 1/2004 | Walmsley | 382/296 |
| 6,771,811 | B1 * | 8/2004 | Walmsley et al. | 382/162 |
| 6,967,663 | B1 * | 11/2005 | Bastos et al. | 345/613 |
| 2002/0180748 | A1 * | 12/2002 | Popescu et al. | 345/582 |
| 2003/0206179 | A1 * | 11/2003 | Deering | 345/589 |
| 2005/0212970 | A1 * | 9/2005 | Joskin | 348/572 |
| 2007/0109320 | A1 * | 5/2007 | Skibak et al. | 345/611 |
| 2007/0257944 | A1 * | 11/2007 | Miller et al. | 345/694 |
| 2009/0179826 | A1 * | 7/2009 | Malka et al. | 345/32 |

* cited by examiner

*Primary Examiner* — Wesner Sajous
(74) *Attorney, Agent, or Firm* — Sterne, Kessler, Goldstein & Fox P.L.L.C.

(57) ABSTRACT

Methods and systems for spatially aware sub-pixel rendering are described herein. Embodiments allow graphics rendering systems to convey additional spatial information in displayed graphics by utilizing sub-pixels of displays. An embodiment includes sampling pixels into a buffer, re-sampling the pixels, at sub-pixel level, at different offset positions from their positions in the buffer and displaying the re-sampled pixels. For example, individual red, green and blue sub-pixels can be re-sampled at offset positions from their original positions within pixels. Since embodiments of the invention can control respective positions of each red, green and blue sub-pixel, embodiments can produce sharp graphics with low aliasing. Furthermore, sub-pixels are effectively used for communicating additional spatial information in rendered graphics.

23 Claims, 9 Drawing Sheets
(4 of 9 Drawing Sheet(s) Filed in Color)

408

SPATIALLY AWARE SUB-PIXEL RENDERING

BACKGROUND

1. Field

Embodiments of the present invention relate to graphics rendering technology, and more particularly to sub-pixel aware rendering.

2. Background Art

Liquid crystal displays (LCDs) are commonly used as displays in a large number of applications. Typically, a single pixel on a color LCD is made of three colored elements, namely, red, green, and blue (RGB). These colored elements, sometimes called sub-pixels, appear as a single color to the human eye because of spatial integration by nerve cells in the eye.

Graphics rendering systems render graphics on LCDs and other types of displays by illuminating appropriate pixels in the displays. However, graphics rendering systems do not take into account spatial positions of individual sub-pixels. This causes lack of sharpness and unwanted aliasing effects in displayed graphics.

BRIEF SUMMARY

Embodiments of the present invention relate to spatially aware sub-pixel rendering. Embodiments allow graphics rendering systems to convey additional spatial information in displayed graphics by utilizing sub-pixels of displays. In an embodiment, a method includes sampling pixels into a buffer, re-sampling the pixels, at a sub-pixel level, at offset positions from their positions in the buffer, and displaying the re-sampled pixels. For example, individual red, green and blue sub-pixels can be re-sampled at different offset positions from their original positions within pixels. Since embodiments of the invention can control respective offset positions of each red, green and blue sub-pixel, embodiments can produce sharp graphics with low aliasing. Furthermore, sub-pixels are effectively used for communicating additional spatial information in rendered graphics.

Further embodiments, features, and advantages of the invention, as well as the structure and operation of the various embodiments of the invention are described in detail below with reference to accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Embodiments of the present invention are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

Embodiments of the present invention relate to spatially aware sub-pixel rendering. As discussed earlier, embodiments allow graphics rendering systems to convey additional spatial information in displayed graphics by utilizing sub-pixels of displays. For example, individual red, green and blue sub-pixels can be re-sampled at different offset positions from their original positions within pixels. Since embodiments of the invention control respective offset positions of each red, green and blue sub-pixel, embodiments can produce sharp graphics with low aliasing. Furthermore, sub-pixels are effectively used for communicating additional spatial information in rendered graphics.

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

System

Figure 1:
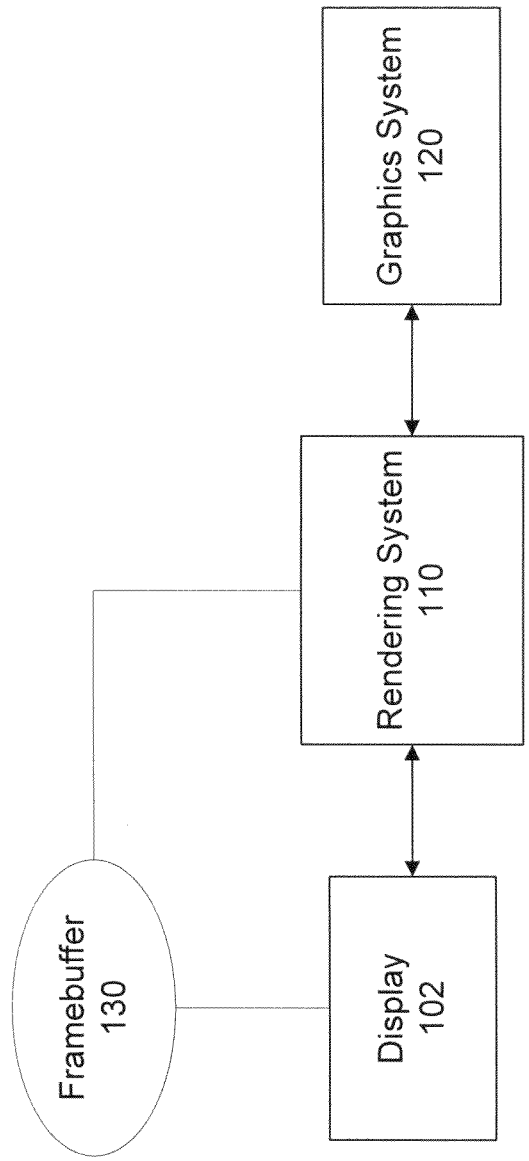
FIG. 1 is diagram illustrating a system for spatially aware sub-pixel rendering, according to an embodiment.

This section describes a system for spatially aware sub-pixel rendering, according to an embodiment of the invention illustrated in FIG. 1. FIG. 1 is a diagram of system 100 for spatially aware sub-pixel rendering. While the following is described in terms of LCDs, embodiments of the invention are not limited to this embodiment. Embodiments of the invention can be used in conjunction with any other display technology such as cathode ray tubes (CRTs), plasma displays, Light Emitting Diode (LED) displays and organic LED (OLED) displays. Embodiments of the invention can be used in conjunction with any spatial pixel or sub-pixel displacement(s) (e.g. horizontal, vertical, diagonal displacements etc.). For example, embodiments of the invention can be used in any system having generally the structure of FIG. 1, or that would benefit from the operation, methods and functions as described herein.

System 100 includes display 102, rendering system 110, graphics system 120 and framebuffer 130. Display 102 can be any type of display that allows a user to view graphics rendered by rendering system 110. As discussed above, display 102 can include LCDs, or any other display technology such as cathode ray tubes (CRTs), plasma displays or Light Emitting Diode (LED) displays.

In an exemplary case where display 102 is an LCD, each individual pixel is divided into three cells, or sub-pixels, which are colored red (R), green (G), and blue (B) or R, G, and B respectively. Each sub-pixel (R, G or B) can be controlled independently by rendering system 110 to yield thousands or millions of possible colors for each pixel. CRT monitors may employ similar sub-pixel structures via phosphors. Because LCDs and CRTs utilize red, green and blue elements, both LCD and CRT monitors are direct applications of the RGB color model and give the illusion of representing a continuous spectrum of hues as a result of the tri-chromatic nature of human vision. While the following is described in terms of rectangular pixels and sub-pixels, it is to be appreciated that embodiments of the invention can be used with pixels and sub-pixels of any shape or form. Furthermore, embodiments of the invention are not limited to R, G and B pixels (or sub-pixels) and can be used with pixels of any color(s).

Graphics system 120 interacts with graphics hardware (not shown) and processes graphics primitives such as lines, polygons and points. Graphics system 120 also processes text, images, shadows, and other graphical primitives. As an example, not intended to limit the invention, graphics system 120 may include programmed routines for drawing graphical primitives such as lines, points and polygons. In an embodiment, graphics system 120 may also initialize framebuffer 130 that is used by rendering system 110. Framebuffers are known to those skilled in the art and are memory buffers that may include a complete frame of graphics data. Information in framebuffer 130 typically comprises color values for every pixel (point that can be displayed) on the display 102. In an embodiment, not intended to limit the invention, framebuffer 130 may be initialized by graphics system 120 (or even rendering system 110) to a preset or background color.

Rendering system 110 connects graphics system 120 with any graphical application specific data and renders graphics into framebuffer 130. In an embodiment, rendering system 110 renders framebuffer 130 at a higher resolution and then sub-samples pixels, at sub-pixel level and at spatial offsets in rendered framebuffer 130.

Rendering system 110 and graphics system 120 may be implemented on any device that can support graphics processing and rendering. Such a device can include, but is not limited to, a personal computer, mobile device such as a mobile phone, workstation, embedded system, game console, television, set-top box, or any other computing device that can support computer graphics and image processing. Such a device may include, but is not limited to, a device having one or more processors and memory for executing and storing instructions. Such a device may include software, firmware, and hardware. Software may include one or more applications and an operating system. Hardware can include, but is not limited to, a processor, memory and display 102.

Figure 2:
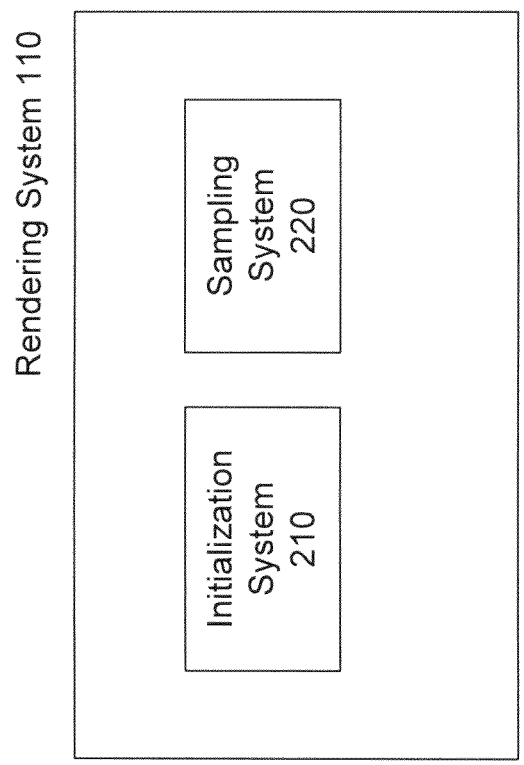
FIG. 2 is a diagram of a rendering system, according to an embodiment.

FIG. 2 illustrates rendering system 110 in greater detail, according to an embodiment. As shown in FIG. 2, rendering system 110 comprises initialization system 210 and sampling system 220. In an embodiment, initialization system 210 initializes framebuffer 130. As an example, framebuffer 130 may be initialized to a preset or background color. In an embodiment, sampling system 220 samples one or more pixels from framebuffer 130 and particularly samples the pixels, at sub-pixel level, at offset positions from their positions in framebuffer 130. The operation of rendering system 110 to accomplish spatially aware sub-pixel rendering is described in detail further below.

Spatially Aware Sub-Pixel Rendering

As stated earlier, embodiments of the invention can produce sharp graphics with low aliasing by using sub-pixels for communicating additional spatial information. For example, individual red, green and blue sub-pixels can be re-sampled at offset positions from their original positions within pixels.

Figure 3A:
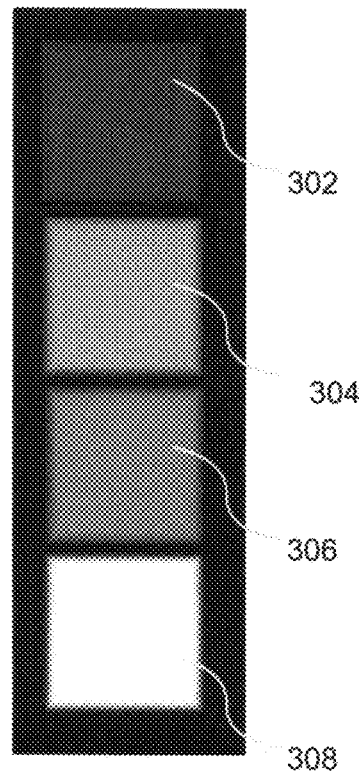
FIG. 3A illustrates an exemplary display in color where sub-pixels are not horizontally displaced.

FIG. 3A illustrates an exemplary display where sub-pixels are not sampled at spatial offset positions. As illustrated in FIG. 3A, blue sub-pixel 302, green sub-pixel 304, and red sub-pixel 306 are located in the same column and are not at spatial offsets. Therefore, when blue sub-pixel 302, green sub-pixel 304, and red sub-pixel 306 are all turned on (or illuminated), a fully white pixel 308 is displayed. Therefore, FIG. 3A illustrates an exemplary scenario that does not convey additional spatial information using display sub-pixels.

Figure 3B:
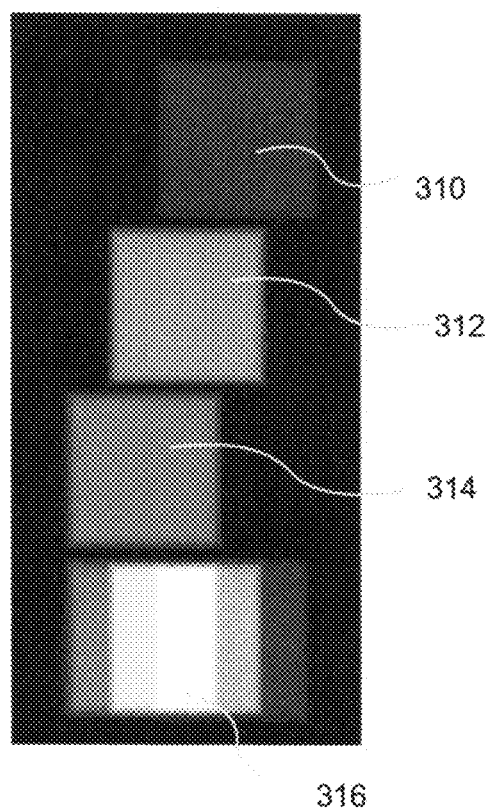
FIG. 3B illustrates an exemplary display in color where sub-pixels are horizontally displaced or located at horizontal offsets.

FIG. 3B illustrates another exemplary display where sub-pixels are horizontally displaced or located at horizontal offsets. As illustrated in FIG. 3B, the blue sub-pixel 310, green sub-pixel 312, and red sub-pixel 314 each have small horizontal incrementing displacements. Therefore, when blue sub-pixel 310, green pixel 312, and red sub-pixel 314 are all turned on (or illuminated), a white pixel 316 having colored edges is generated.

Figure 3C:
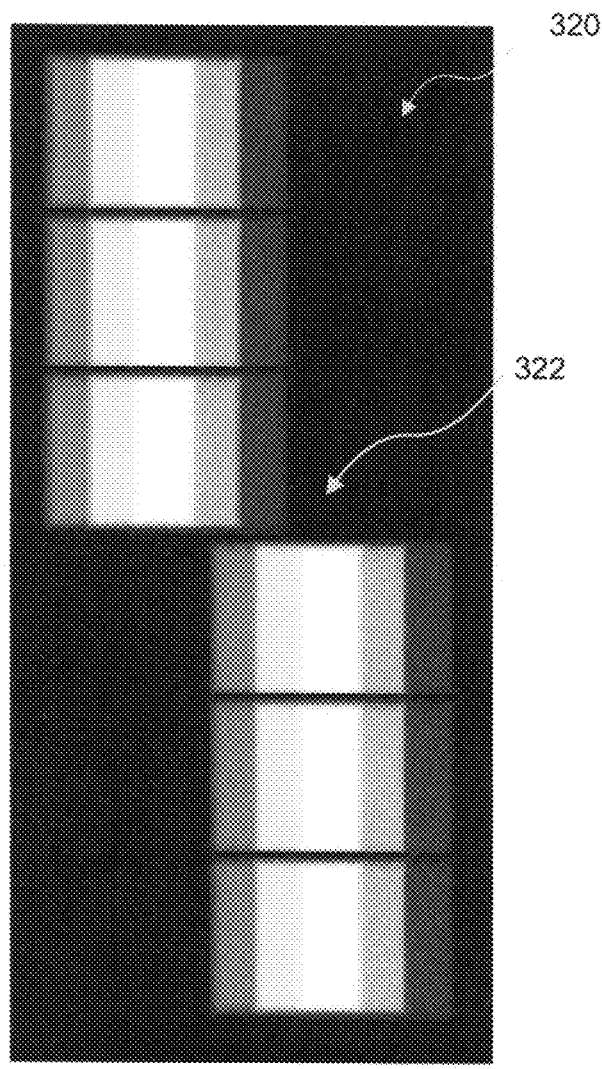
FIG. 3C illustrates an exemplary display in color where a white line is composed of a plurality of pixels.

Now consider a scenario where a vertical white line is to be rendered. FIG. 3C illustrates a nearly vertical white line 320 of having a length of six pixels. Each pixel in white line 320 has its sub-pixels arranged in R-G-B format, i.e. a red sub-pixel followed by a, green sub-pixel followed by a blue sub-pixel. White line 320 displays an abrupt shift 322 at its center because it has been rendered without taking into account independent spatial positioning of each R, G and B sub-pixel of display 102. Such abrupt shifts in rendered graphics as exemplified by line 320 are unpleasant to viewers of display 102. Present rendering techniques are unable to individually sample and render specific sub-pixels at desired offsets in displays. In contrast, embodiments of the present invention accomplish spatially aware sub-pixel rendering by taking into account individual spatial positions of each sub-pixel (e.g. each R, G, or B sub-pixel) of display 102.

Figure 3D:
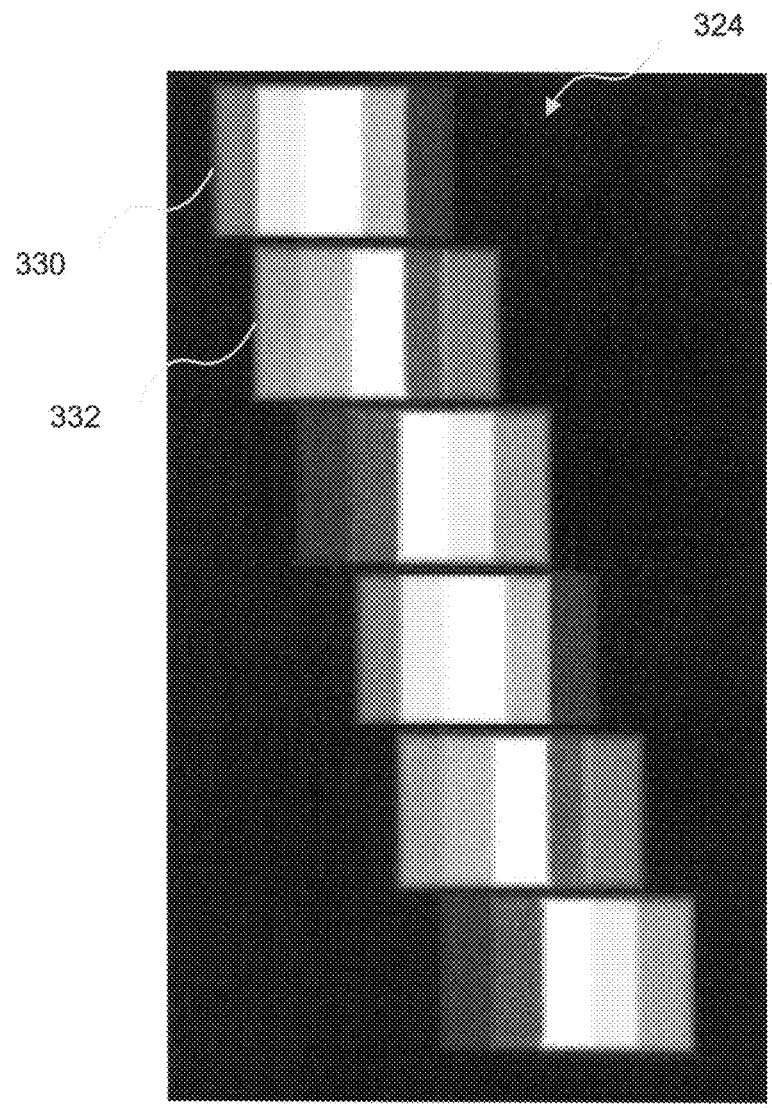
FIG. 3D illustrates an exemplary display in color where a white line is rendered according to embodiments of the invention.

For example, FIG. 3D illustrates display 102 where white line 324 is rendered by rendering system 110 according to embodiments of the invention. As can be seen in FIG. 3D, white line 324 has more horizontal spatial resolution and appears less jagged. This is because sampling system 220 has sub-sampled appropriate sub-pixels at horizontal offsets to generate white line 324. For example, in first pixel 330, a red sub-pixel is sub-sampled, followed by a horizontally displaced green sub-pixel, followed by a further horizontally displaced blue sub-pixel. However in second pixel 332 appearing below first pixel 330, a green sub-pixel is sub-sampled, followed by a horizontally displaced blue sub-pixel, followed by a further horizontally displaced red sub-pixel. Therefore, in this example, sampling system 220 determines which sub-pixel (of R, G or B) to sub-sample at offset positions. This approach differs from the approach illustrated in FIG. 3C because, in embodiments of the present invention, different sub-pixel offset combinations may be used (e.g. sub-sampling R-B-G in one pixel followed by sampling G-B-R in the next pixel) instead of using the same R-G-B sub-pixel combination for each row as illustrated in FIG. 3C. Returning to FIG. 3D, the process of sub-sampling sub-pixels by sampling system 220 continues until a complete and sharper white line 324 is rendered by rendering system 110. It is apparent that sub-pixel aware rendering, accomplished by embodiments of the invention, has created a better viewing experience.

In another embodiment, rendering system 110 may use analytic anti-aliasing for computing R, G and B sub-pixels at offset locations. Analytic anti-aliasing is known to those skilled in the art. As a purely illustrative example, in analytic anti-aliasing, values of R, G, and B sub-pixels may be computed using integrals (e.g. volume integrals) within pixel boundaries.

Method

Figure 4A:
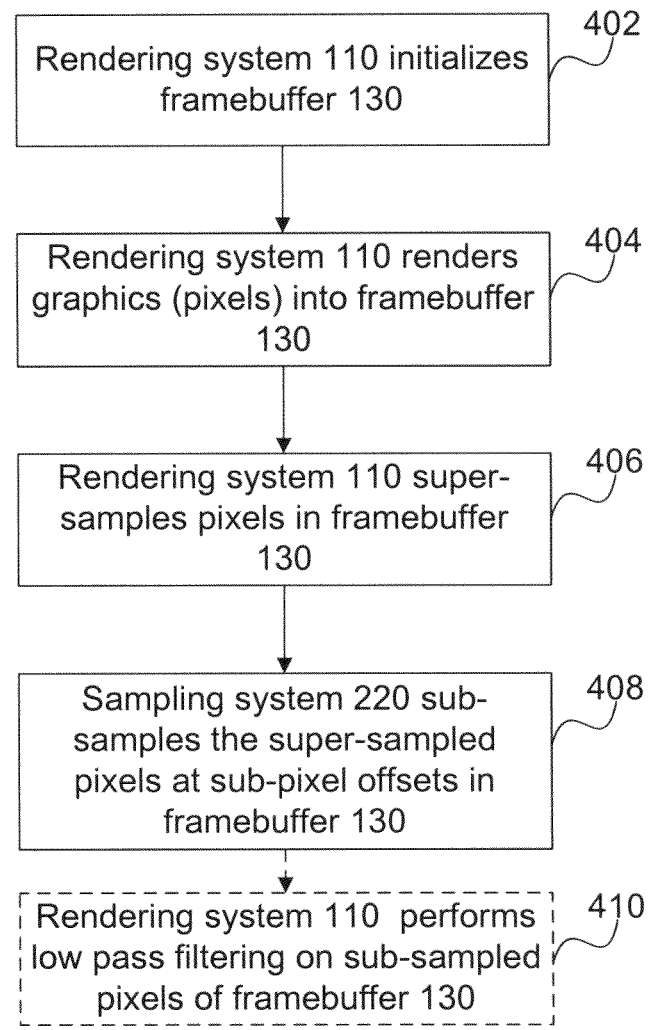
FIG. 4A is a flowchart illustrating an operation of a rendering system, according to an embodiment.

FIG. 4A illustrates method 400 which is an overall operation of rendering system 110, according to an embodiment.

Method 400 begins with the initialization of framebuffer 130 by rendering system 110 (step 402). As an example, initialization of framebuffer 130 can be accomplished by initialization system 210 in rendering system 110. As discussed above, in an embodiment, framebuffer 130 may be initialized by initialization system 210 to a preset or background color. In another embodiment, framebuffer 130 may be initialized by graphics processing system 120.

Once framebuffer 130 has been initialized (step 402), rendering system 120 renders graphics into framebuffer 130 (step 404). In an embodiment, this is accomplished by using graphics system 120 to draw graphical primitives that are a part of graphics rendered into framebuffer 130. Graphical primitives are basic graphical components that can be composed to represent arbitrarily complex graphics objects. As known to those skilled in the art, modern computer graphics systems may operate with primitives which are lines (segments of straight lines, circles and more complicated curves), as well as shapes (boxes, arbitrary polygons, circles). A common set of two-dimensional primitives includes lines, points, and polygons.

In an embodiment, pixels associated with graphics rendered in framebuffer 130 are super-sampled by rendering system 110 (step 406). The process of super-sampling is known to those skilled in the art. As is known, displays can only display discrete points of light called pixels. As discussed earlier, sub-pixel rendering utilizes display 102's directly addressable sub-pixels to increase (e.g. triple) the effective horizontal resolution of the display. This can be achieved by super-sampling the pixels in framebuffer 130 or effectively rendering the image at a much higher resolution than the one being displayed. As a purely illustrative example, an image may be rendered at triple the horizontal width, allowing rendering system 110 to individually address each sub-pixel (e.g. R, G, and B). (Although, in this embodiment, pixels in framebuffer 130 are super-sampled to allow allowing rendering system 110 to separately address each sub-pixel, it is to be appreciated that other embodiments may also directly address each sub-pixel at any resolution.)

Once framebuffer 130 is super-sampled, it is sub-sampled at sub-pixel offsets by sampling system 220 (step 408). Such a sub-sampled output can be at a desired image resolution. In particular, and as described earlier with respect to FIG. 3D, sampling system 220 re-samples the pixels, at sub-pixel level, at offset positions from their positions in super-resolution framebuffer 130 and then displays the re-sampled pixels on display 102. Therefore, in this example, sampling system 220 determines which sub-pixel (of R, G or B) to sub-sample at offset positions. In embodiments of the present invention, different sub-pixel offset combinations may be used (e.g. sampling R-B-G in one row followed by sampling G-B-R in the next row) instead of using the same R-G-B sub-pixel combination for each row as illustrated in FIG. 3C. The process of sub-sampling sub-pixels by sampling system 220 continues till a complete and sharper image (e.g. white line 324) is rendered by rendering system 110.

Optionally rendering system 110 can perform low pass filtering on sub-sampled pixels of framebuffer 130 (step 410). Low pass filtering may reduce color bleeding or any transfer of color between neighboring pixels of framebuffer 130. As an example, not intended to limit the invention, a n×n (e.g. 5×5) block filter can be used for low pass filtering of the sub-sampled pixels in framebuffer 130. A low-pass filter may be defined by a kernel, which is a small array applied to each pixel and its neighbors within an image. In most applications, the center of the kernel is aligned with the current pixel, and can be a square grid with an odd number (e.g. 3, 5, 7, etc.) of elements in each dimension.

Figure 4B:
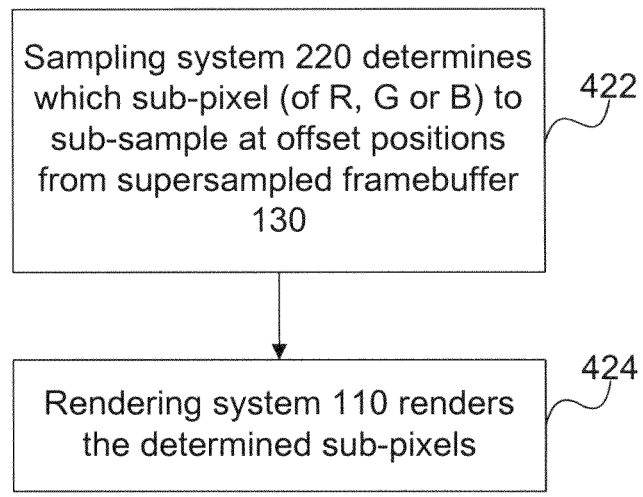
FIG. 4B is a flowchart illustrating an operation of a sampling system, according to an embodiment.

FIG. 4B is flowchart 408 illustrating step 408 of flowchart 400 in greater detail. Particularly, flowchart 408 illustrates sub-sampling of super-sampled framebuffer 130 at sub-pixel offsets by sampling system 220.

In step 422, sampling system 220 determines which sub-pixels (of R, G and B) to sub-sample at offset positions from super-sampled framebuffer 130. In embodiments of the present invention, different sub-pixel offset combinations may be used (e.g. sampling R-B-G in one pixel followed by sampling G-B-R in the next pixel) instead of using the same R-G-B sub-pixel combination for each row as illustrated in FIG. 3C.

In step 424, rendering system 110 renders the sub-pixels determined in step 422. For example, rendering system 110 can illuminate the determined sub-pixel combination on display 102.

Exemplary Applications

Embodiments of the invention can be used to render digital maps on displays using digital mapping software. Digital mapping software, such as the GOOGLE MAPS service from GOOGLE Inc. of Mountain View, Calif. is one example of the mapping software or application that can be used. Digital mapping software may have the ability to render complex colored maps and geographical imagery. Therefore, it is essential that such complex details be displayed with low aliasing effects. Embodiments of the invention can produce sharp graphics with low aliasing by using sub-pixels for communicating additional spatial information included in such maps and digital imagery. For example, fine lines representing topographical features can be represented accurately on displays. Other applications include rendering architectural and (civil) engineering drawings that usually include several fine lines.

Embodiments of the invention can also be used in environments that utilize client side rendering. In particular, such environments can include mobile devices that retrieve data from a server and render digital imagery on a display of a mobile device. Such mobile device displays are typically limited to a smaller number of pixels. Because embodiments of the invention are able to manipulate sub-pixels, the embodiments help producing images with low-aliasing on such mobile device displays and all smaller displays in general.

Embodiments of the invention can also be used in displaying crisper (or sharper) thumbnails or very small images that exhibit low aliasing effects. Thus, embodiments of the invention can be used to improve rendering of thumbnail images in imaging or photo manipulation applications such as in the PICASA photo sharing service available from GOOGLE Inc. of Mountain View, Calif.

Example Computer Embodiment

Figure 5:
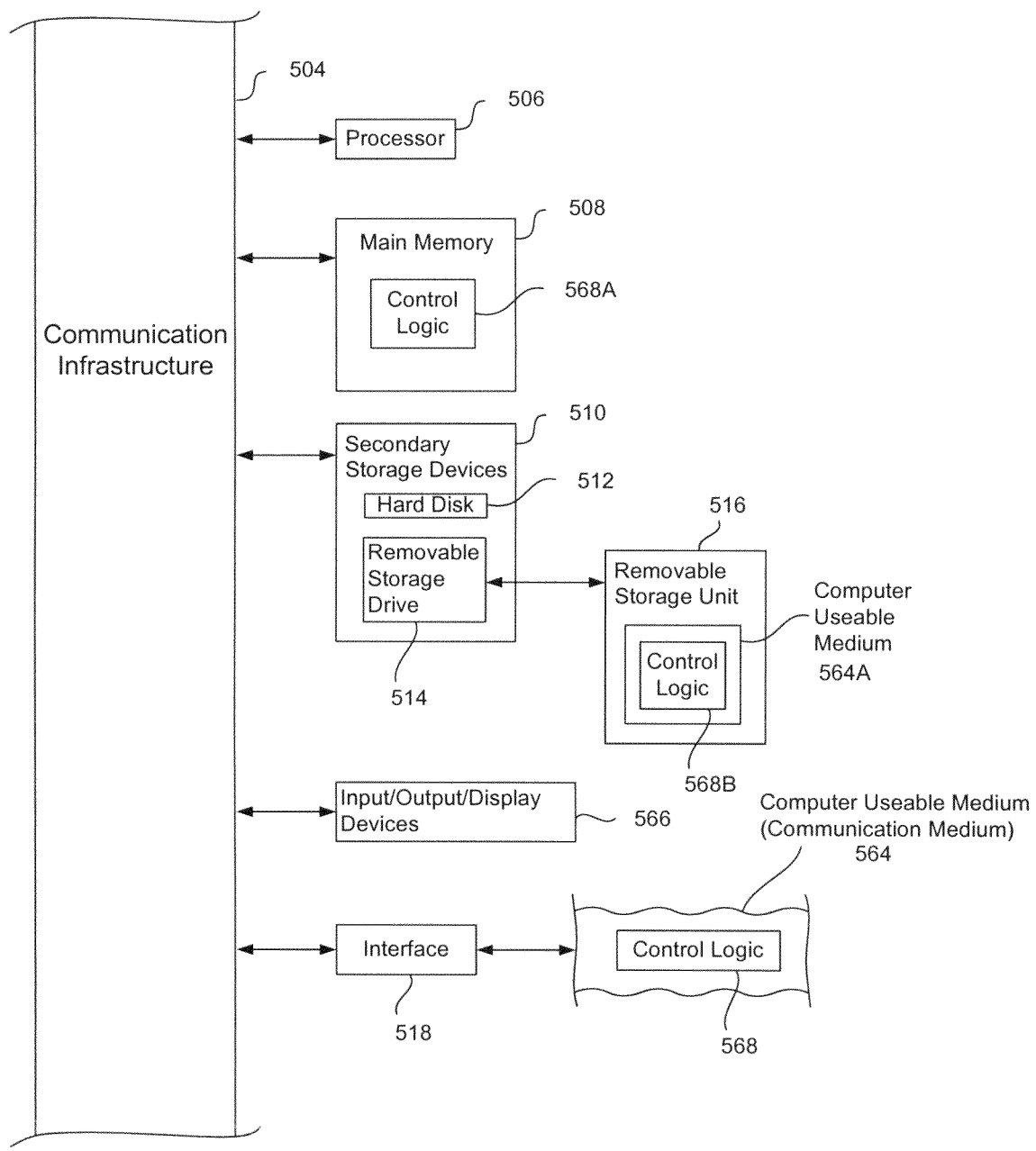
FIG. 5 illustrates an example computer useful for implementing components of embodiments of the invention.

In an embodiment of the present invention, the system and components of embodiments described herein are implemented using well known computers, such as example computer 502 shown in FIG. 5. For example, rendering system 110 and graphics system 120 can be implemented using computer(s) 502.

The computer 502 can be any commercially available and well known computer capable of performing the functions described herein, such as computers available from International Business Machines, Apple, Sun, HP, Dell, Compaq, Cray, etc.

The computer 502 includes one or more processors (also called central processing units, or CPUs), such as a processor 506. The processor 506 is connected to a communication infrastructure 504.

The computer 502 also includes a main or primary memory 508, such as random access memory (RAM). The primary memory 508 has stored therein control logic 525A (computer software), and data.

The computer 502 also includes one or more secondary storage devices 510. The secondary storage devices 510 include, for example, a hard disk drive 512 and/or a removable storage device or drive 514, as well as other types of storage devices, such as memory cards and memory sticks. The removable storage drive 514 represents a floppy disk drive, a magnetic tape drive, a compact disk drive, an optical storage device, tape backup, etc.

The removable storage drive 514 interacts with a removable storage unit 516. The removable storage unit 516 includes a computer useable or readable storage medium 524 having stored therein computer software 528B (control logic) and/or data. Removable storage unit 516 represents a floppy disk, magnetic tape, compact disk, DVD, optical storage disk, or any other computer data storage device. The removable storage drive 514 reads from and/or writes to the removable storage unit 516 in a well known manner.

The computer 502 also includes input/output/display devices 522, such as monitors, keyboards, pointing devices, etc.

The computer 502 further includes a communication or network interface 518. The network interface 518 enables the computer 502 to communicate with remote devices. For example, the network interface 518 allows the computer 502 to communicate over communication networks or mediums 524B (representing a form of a computer useable or readable medium), such as LANs, WANs, the Internet, etc. The network interface 518 may interface with remote sites or networks via wired or wireless connections.

Control logic 528C may be transmitted to and from the computer 502 via the communication medium 524B. More particularly, the computer 502 may receive and transmit carrier waves (electromagnetic signals) modulated with control logic 530 via the communication medium 524B.

Any tangible apparatus or article of manufacture comprising a computer useable or readable medium having control logic (software) stored therein is referred to herein as a computer program product or program storage device. This includes, but is not limited to, the computer 502, the main memory 508, secondary storage devices 510, the removable storage unit 516 but not the carrier waves modulated with control logic 530. Such computer program products, having control logic stored therein that, when executed by one or more data processing devices, cause such data processing devices to operate as described herein, represent embodiments of the invention.

Embodiments of the invention can work with software, hardware, and/or operating system implementations other than those described herein. Any software, hardware, and operating system implementations suitable for performing the functions described herein can be used. Embodiments of the invention are applicable to both a client and to a server or a combination of both.

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer implemented method for spatially aware sub-pixel rendering, comprising:
   sampling, using one or more processors, pixels in a buffer;
   re-sampling the pixels, at a sub pixel level, at different offset positions from their positions in the buffer, including determining an order of re-sampling of sub-pixels based on one or more colors of the sub-pixels, wherein the pixels are re-sampled based on the determined order; and
   displaying the re-sampled pixels,
   wherein the re-sampling step is implemented using the one or more processors.

2. The method of claim 1, wherein the sampling comprises:
   initializing the buffer; and
   super-sampling a plurality of pixels in the buffer.

3. The method of claim 2, wherein the initializing comprises setting all pixels in the buffer to a background color.

4. The method of claim 1, wherein the re-sampling comprises:
   determining an order of sampling of red, blue and green sub-pixels in each pixel; and
   sub-sampling each of the red, blue and green sub-pixels, in the determined order, at different offset positions from their positions in the buffer.

5. The method of claim 1, further comprising:
   super-sampling a plurality of pixels in the buffer to generate a super-sampled buffer; and
   sub-sampling red, blue and green sub-pixels at different offset positions from their positions in the super-sampled buffer.

6. The method of claim 1, further comprising:
   filtering the re-sampled pixels.

7. The method of claim 6, wherein the filtering comprises low pass filtering of the pixels.

8. The method of claim 6, wherein the filtering comprises:
   filtering using a super-sampled filter.

9. The method of claim 1, wherein the buffer is a super-sampled buffer.

10. The method of claim 1, wherein the re-sampling comprises:
    analytically anti-aliasing each of red, blue and green sub-pixels at different offset positions from their positions in the buffer.

11. A computer based system for spatially aware sub-pixel rendering, comprising:

one or more processors;
a rendering system configured to sample pixels into a buffer, determine an order of re-sampling of sub-pixels in each pixel, wherein the order is based on one or more colors of the sub-pixels and re-sample the pixels, at sub-pixel level, at different offset positions from their positions in the buffer, and based on the determined order; and
a graphics system to provide one or more graphics primitives to the rendering system,
wherein the rendering system and the graphics system are implemented using the one or more processors.

12. The system of claim 11, wherein the pixels include red, blue and green sub-pixels.

13. The system of claim 11, wherein the rendering system further comprises:
an initialization system to initialize one or more buffers; and
a sampling system to sample one or more color pixels.

14. The system of claim 11, wherein the rendering system super-samples a plurality of pixels in the buffer to generate a super-sampled buffer and sub-samples red, blue and green sub-pixels at different offset positions from their positions in the super-sampled buffer.

15. The system of claim 11, wherein the graphics are rendered on a liquid crystal display (LCD).

16. A computer program product having control logic stored therein, said control logic enabling one or more processors to perform spatially aware sub-pixel rendering according to a method, the method comprising:
sampling pixels into a buffer;
re-sampling the pixels, at sub pixel level, at different offset positions from their positions in the buffer, including determining an order of re-sampling of sub pixels based on one or more colors of the sub-pixels, wherein the pixels are re-sampled based on the determined order; and
displaying the re-sampled pixels.

17. The computer program product of claim 16, the method further comprising:
initializing the buffer; and
super-sampling a plurality of pixels in the buffer.

18. The computer program product of claim 17, the initializing further comprising setting all pixels in the buffer to a background color.

19. The computer program product of claim 16, the re-sampling further comprising:
determining an order of sampling of red, blue and green sub-pixels in each pixel; and
sub-sampling each of the red, blue and green sub-pixels, in the determined order, at different offset positions from their positions in the buffer.

20. The computer program product of claim 16, the method further comprising:
super-sampling a plurality of pixels in the buffer to generate a super-sampled buffer; and
sub-sampling red, blue and green sub-pixels at different offset positions from their positions in the super-sampled buffer.

21. A computer implemented method for spatially aware sub-pixel rendering, comprising:
initializing a buffer, wherein the initializing comprises setting all pixels in the buffer to a background color;
sampling, using one or more processors, the pixels in the buffer;
re-sampling the pixels, at a sub pixel level, at different offset positions from their positions in the buffer, including determining an order of re-sampling of sub-pixels based on one or more colors of the sub-pixels, wherein the pixels are re-sampled based on the determined order; and
displaying the re-sampled pixels,
wherein the initializing, sampling and re-sampling steps are implemented using the one or more processors.

22. A computer based system for spatially aware sub-pixel rendering, comprising:
one or more processors;
an initialization system configured to initialize a buffer, wherein pixels in the buffer are set to a background color;
a rendering system configured to sample the pixels in the buffer determine an order of re-sampling of sub-pixels in each pixel, wherein the order is based on one or more colors of the sub-pixels and re-sample the pixels, at sub-pixel level, at different offset positions from their positions in the buffer and based on the determined order; and
a graphics system to provide one or more graphics primitives to the rendering system,
wherein the initialization system, rendering system and the graphics system are implemented using the one or more processors.

23. A computer program product having control logic stored therein, said control logic enabling one or more processors to perform spatially aware sub-pixel rendering according to a method, the method comprising:
initializing a buffer, wherein the initializing comprises setting all pixels in the buffer to a background color;
sampling pixels into the buffer;
re-sampling the pixels, at sub pixel level, at different offset positions from their positions in the buffer, including determining an order of re-sampling of sub-pixels based on one or more colors of the sub-pixels, wherein the pixels are re-sampled based on the determined order; and
displaying the re-sampled pixels.

* * * * *